Figures 1, 2:
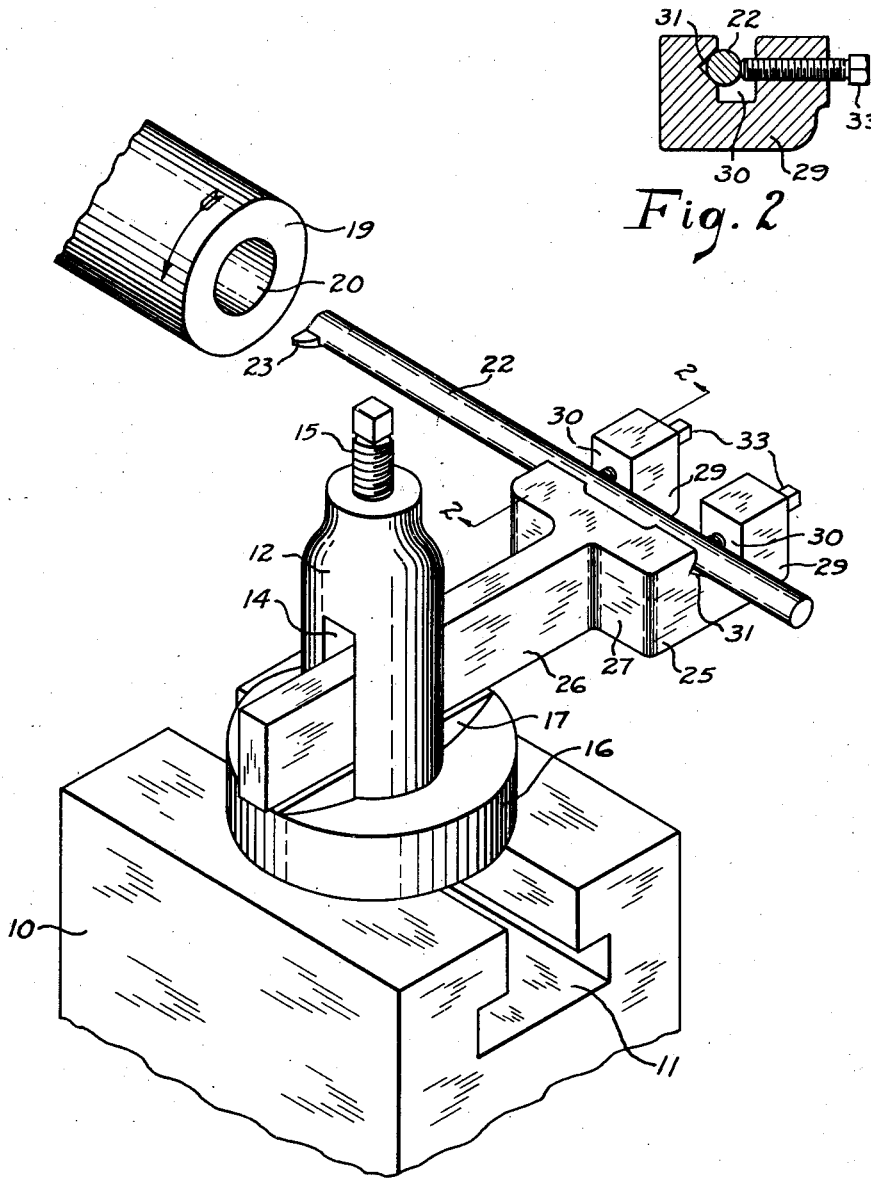

Aug. 31, 1943.   F. M. RAMSDELL   2,328,359
TOOL HOLDER
Filed March 6, 1942

Inventor
FREDERICK M. RAMSDELL
By Albert G. Blodgett
Attorney

Patented Aug. 31, 1943

2,328,359

UNITED STATES PATENT OFFICE 2,328,359

TOOL HOLDER

Frederick M. Ramsdell, Worcester, Mass.

Application March 6, 1942, Serial No. 433,562

5 Claims. (Cl. 77—58)

This invention relates to tool holders, and more particularly to a device for supporting a boring bar and adapted to be mounted on a lathe or the like.

When boring a hole in a work piece it is often of great importance for the operator to watch the action of the cutting point of the tool, so that he may avoid cutting away too much material or otherwise spoiling the work. Such inspection of the cutting action is very difficult and in many cases impossible when prior types of boring bar holders are employed. This is particularly true in the case of deep holes with comparatively small diameters. In an attempt to solve this problem, some operators permit the boring bar to extend considerably beyond the tool holder for a distance considerably exceeding the depth of the hole, but this excessive overhang promotes chattering, necessitates very fine feeding rates, and is far from satisfactory.

It is accordingly one object of the invention to provide a comparatively simple and dependable holder which will support a boring bar firmly and permit the operator to watch the action of the cutting point.

It is a further object of the invention to provide a boring bar holder so constructed and arranged that the overhang of the bar may be only slightly greater than the depth of the hole to be bored, and yet the operator may watch the cutting point as it approaches the bottom of the hole.

With these and other objects in view, as will be apparent to those skilled in the art, the invention resides in the combination of parts set forth in the specification and covered by the claims appended hereto.

Referring to the drawing illustrating one embodiment of the invention, and in which like reference numerals indicate like parts, Fig. 1 is a perspective view of a boring bar holder mounted on a lathe and ready for use; and Fig. 2 is a section on the line 2—2 of Fig. 1.

In the drawing I have shown the tool slide 10 of a lathe, provided with the usual T-slot 11 to receive the lower end of an ordinary upright tool post 12 with its customary slot 14. The usual clamping screw 15 is provided in the upper end of the tool post. A washer 16 with a concave upper surface rests on the tool slide 10 in surrounding relation to the tool post, and the usual rocker shoe 17 extends through the slot 14 and rests on this washer. A work piece 19 is mounted in the lathe chuck (not shown) and thereby rotated about a horizontal axis, this work piece having a hole 20 therein which is to be enlarged by boring. The boring operation is performed by means of a boring bar 22 of any suitable construction but preferably in the form of an elongated cylindrical rod having a cutting point 23 projecting laterally from one end. This cutting point or "bit" may be integral with the bar or removably secured thereon in known manner.

The present invention is concerned with the construction of a holder 25 adapted to support the boring bar 22 in a position substantially parallel with the axis of rotation of the work piece 19. This holder 25 comprises an elongated horizontal shank 26 of rectangular cross-section, and a portion 27 integral with the shank and extending transversely at one end thereof to form a T-shaped structure as viewed from above. Two substantially horizontal branches or fingers 29 extend from opposite ends of the transverse portion 27 to cooperate therewith in providing a bifurcated head, these fingers being located on the other side of the portion 27 from the shank 26. A transverse upwardly-open groove 30 is provided in the upper surface of each finger 29 at substantially right angles with the shank 26, the inner wall of each groove having a V-shaped notch 31 therein. The two notches 31 are aligned. A substantially horizontal screw 33 is mounted in the outer end of each finger in approximate alignment therewith, these screws extending into the grooves 30, with the ends of the screws opposed to the notches 31.

In utilizing the invention, the shank 26 will be inserted through the slot 14 of the tool post 12, and clamped downwardly against the rocker shoe 17 by means of the screw 15. The boring bar 22 will be placed in the grooves 30, with an amount of overhang only slightly exceeding the depth of the hole 20. The screws 33 will then be tightened to force the bar firmly into the notches 31. By loosening the tool post screw 15 and sliding the rocker shoe 17 in or out, the shank 26 can be tilted as required to bring the cutting point 23 to the proper height, whereupon the screw 15 will again be tightened. During this adjustment the boring bar will remain parallel with the axis of the work piece. The boring operation can now proceed, and the operator can watch the cutting action of the tool by looking along the top surface of the boring bar from the right hand end thereof. Since the construction of the holder 27 is such as to leave the top of the boring bar entirely unobstructed, this inspection of the cutting action is possible even as the tool 23 reaches the bottom of the hole 20 and the holder is located close to the work piece. Thus the invention provides great and important advantages in operation. Furthermore it is comparatively simple and inexpensive to manufacture.

Having thus described my invention, what I claim as new and desire to secure by Letters Patent is:

1. A tool holder comprising a supporting shank, a head integral with the shank and provided in its upper surface with an upwardly-open groove extending at substantially right angles with the shank and adapted to receive a substantially horizontal boring bar or the like, and means to clamp the boring bar within the groove while leaving the top of the bar unobstructed.

2. A tool holder comprising a supporting shank, a head integral with the shank and provided in its upper surface with an upwardly-open groove extending at substantially right angles with the shank and adapted to receive a substantially horizontal boring bar, the groove having a notch in its inner wall, and means to force the boring bar firmly into the notch while leaving the top of the bar unobstructed.

3. A tool holder comprising a supporting shank, a bifurcated head integral with the shank and having two substantially horizontal fingers, each finger having a transverse upwardly-open groove in its upper surface, the grooves being aligned and adapted to receive a substantially horizontal boring bar, and a substantially horizontal screw mounted in the outer end of each finger and extending into the corresponding groove to clamp the bar in place while leaving its upper surface unobstructed.

4. A tool holder comprising a shank, a bifurcated head integral with the shank and having two substantially horizontal fingers extending outwardly away from the shank, each finger having a transverse upwardly-open groove in its upper surface and a notch in the inner wall of each groove, the grooves being aligned and adapted to receive a substantially horizontal boring bar, and a substantially horizontal screw mounted in the outer end of each finger and extending into the corresponding groove, the screws being arranged to force the bar firmly into the notches while leaving its upper surface unobstructed.

5. A tool holder comprising a substantially horizontal shank, a portion extending transversely at one end of the shank to form a T-shaped structure as viewed from above, two substantially horizontal fingers extending outwardly from opposite ends of the transverse portion and located on the other side thereof from the shank, each finger having an upwardly-open groove in its upper surface and a notch in the inner wall of the groove, the grooves being aligned and adapted to receive a substantially horizontal boring bar, and a substantially horizontal screw mounted in the outer end of each finger and extending into the corresponding groove, the screws being arranged to force the bar firmly into the notches while leaving its upper surface unobstructed.

FREDERICK M. RAMSDELL.